US012747786B2

(12) United States Patent
Thorwart et al.

(10) Patent No.: US 12,747,786 B2
(45) Date of Patent: Sep. 29, 2026

(54) DRIVING DEVICE WITH A PARKING LOCK ARRANGEMENT AND DRIVABLE VEHICLE AXLE WITH A DRIVING DEVICE

(71) Applicant: ZF Friedrichshafen AG, Friedrichshafen (DE)

(72) Inventors: Alexander Thorwart, Langenargen (DE); Bernard Hunold, Friedrichshafen (DE); Michael Preuß, Friedrichshafen (DE); Johannes Glückler, Friedrichshafen (DE); Niclas Raeder, Bermatingen (DE)

(73) Assignee: ZF Friedrichshafen, Friedrichshafen (DE)

( * ) Notice: Subject to any disclaimer, the term of this patent is extended or adjusted under 35 U.S.C. 154(b) by 0 days.

(21) Appl. No.: 18/980,099

(22) Filed: Dec. 13, 2024

(65) Prior Publication Data

US 2025/0198511 A1 Jun. 19, 2025

(30) Foreign Application Priority Data

Dec. 15, 2023 (DE) ..................... 10 2023 212 757.1

(51) Int. Cl.
*F16H 37/08* (2006.01)
*F16H 61/04* (2006.01)
(Continued)

(52) U.S. Cl.
CPC ....... *F16H 63/3408* (2013.01); *F16H 37/082* (2013.01); *F16H 61/0403* (2013.01);
(Continued)

(58) Field of Classification Search
CPC ............... F16H 37/082; F16H 61/0403; F16H 2061/0422; F16H 63/18; F16H 63/3433; F16H 63/3475; F16H 63/3408; F16H 63/3069; F16H 63/3491; F16H 63/3425; F16H 63/3466; F16H 2063/3059; F16H 2063/3093; F16H 2200/0021; F16H 2200/0034; F16H 2200/0039;
(Continued)

(56) References Cited

U.S. PATENT DOCUMENTS 11,623,510 B2 4/2023 Engerman
12,326,160 B2 * 6/2025 Wassermann ........... H01F 7/081
(Continued)

*Primary Examiner* — Farhana Pervin
(74) *Attorney, Agent, or Firm* — Secant IP, PLLC

(57) ABSTRACT

A drive unit with a parking lock arrangement has a parking lock gear, a parking lock pawl, and a parking lock tappet. An actuation unit can move the tappet against a shifting force into a locking shift position in which the tappet enables an actuating movement of the pawl toward a release position, in which the pawl enables a rotary movement of the parking lock gear. The actuation unit is operatively connected to a shift actuator system of a manual gearbox having at least two speeds. The actuation unit is configured to transfer the tappet from the locking shift position to the releasing shift position by means of spaced-apart cams when one of the speeds is engaged. In a neutral operating state, where no speed is engaged and the power train is interrupted, the actuation unit releases the actuating movement of the tappet toward the locking shift position.

19 Claims, 14 Drawing Sheets

Figure 1:
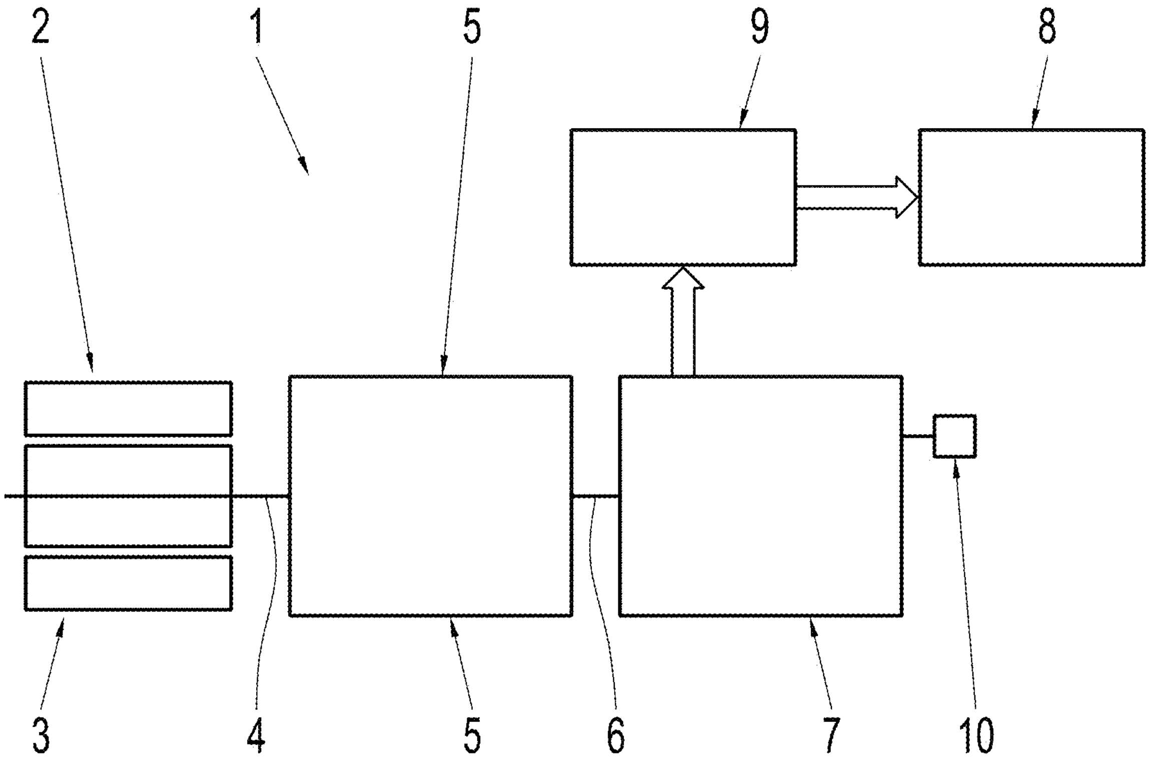

(51) Int. Cl.
*F16H 63/18* (2006.01)
*F16H 63/34* (2006.01)

(52) U.S. Cl.
CPC ......... *F16H 63/18* (2013.01); *F16H 63/3433* (2013.01); *F16H 63/3475* (2013.01); *F16H 2061/0422* (2013.01); *F16H 2200/0021* (2013.01); *F16H 2200/0034* (2013.01); *F16H 2200/0039* (2013.01); *F16H 2200/2005* (2013.01); *F16H 2200/2094* (2013.01)

(58) Field of Classification Search
CPC ..... F16H 2200/2005; F16H 2200/2094; F16H 2200/2041; F16H 2200/2064; B60K 1/00; B60K 2001/001
See application file for complete search history.

(56) References Cited

U.S. PATENT DOCUMENTS

| | | | | |
|---|---|---|---|---|
| 2007/0272511 | A1* | 11/2007 | Saitoh | F16H 63/3466 192/219.5 |
| 2020/0158238 | A1* | 5/2020 | Kwon | F16H 63/304 |
| 2020/0166130 | A1* | 5/2020 | Kwon | F16H 63/3466 |
| 2021/0116021 | A1* | 4/2021 | Kim | F16H 61/688 |
| 2021/0172520 | A1* | 6/2021 | Wiesner | F16H 63/3483 |
| 2021/0276409 | A1* | 9/2021 | Devreese | B60K 17/06 |
| 2022/0065334 | A1* | 3/2022 | Martin | B60K 17/02 |
| 2024/0174071 | A1* | 5/2024 | Mock | F16H 3/54 |
| 2024/0401680 | A1* | 12/2024 | Schilder | B60K 1/00 |
| 2025/0137531 | A1* | 5/2025 | Gruber | F16H 63/3433 |

* cited by examiner

DRIVING DEVICE WITH A PARKING LOCK ARRANGEMENT AND DRIVABLE VEHICLE AXLE WITH A DRIVING DEVICE

RELATED APPLICATIONS

This application claims the benefit of and right of priority under 35 U.S.C. § 119 to German Patent Application no. 10 2023 212 757.1, filed on 15 Dec. 2023, the contents of which are incorporated herein by reference in its entirety.

FIELD OF THE DISCLOSURE

The invention relates to a drive unit with a parking lock arrangement as defined in the present disclosure. The invention also relates to a drivable vehicle axle with a drive unit.

BACKGROUND

An electric drive axle for a vehicle is known from DE 10 2021 134 209 A1. The electric drive axle includes an electric motor-generator, a gearbox, and a differential. The gearbox includes a planetary gear set with a sun gear adapted to rotate on a sun gear shaft. The sun gear shaft is directly coupled to a rotor of the electric motor-generator. In addition, an intermediate shaft is provided, which includes an intermediate gear that is rotatably coupled to a pinion that is rotatably connected to the carrier.

In addition, the drive axle includes a parking mechanism with an actuation unit that can be actuated electronically, pneumatically, and/or hydraulically. It is also proposed that the actuation unit be designed with a fork or other mechanism designed to engage a parking gear to selectively prevent movement of the parking gear. The sun gear shaft may have an extended section that passes through a central opening in the carrier. The extended section can be conceptually incorporated into the parking mechanism. In addition, the parking gear is located at a first end of the sun gear shaft and an interface with the rotor shaft is located at the opposite second end of the sun gear shaft. The gearbox is designed as a three-stage gearbox and a single-speed gearbox.

SUMMARY

The present invention is based on the task of reducing or eliminating at least one disadvantage of a previously known solution or of proposing an alternative solution. In particular, the present invention is particularly directed to providing a drive unit with a parking lock arrangement, in particular an electric drive axle of a vehicle, which is improved with respect to at least one of the following factors: Manufacturing costs, complexity of manufacturing, assembly effort, use of space, operational safety, functionality, sustainability, and component reliability.

The problem is solved by a drive unit with a parking lock arrangement and a drivable vehicle axle as provided herein. Additional embodiments and advantages will be apparent from the present disclosure.

A drive unit is proposed that is cost-effective, compact, and easy to actuate, with a parking lock arrangement that includes a parking lock gear and a parking lock pawl. The parking lock gear is held in a locked position by a rotatably mounted parking lock pawl, which holds it in a rotationally fixed manner, wherein the parking lock is then engaged. In addition, the parking lock gear can be turned in a release position of the parking lock pawl, wherein the parking lock is then disengaged. In addition, the parking lock arrangement has a parking lock tappet that can be moved longitudinally between a locking shift position and a releasing shift position. The parking lock tappet is subjected to a shifting force that acts on the parking lock tappet in the direction of the locking shift position.

The parking lock pawl is held in the locked position by the parking lock tappet when the parking lock tappet is in the locking shift position. In addition, the parking lock tappet can be moved by an actuation unit against the shifting force into the releasing shift position, in which the parking lock tappet releases the actuating movement of the parking lock pawl in the direction of the release position.

In other words. the parking lock tappet is moved to the locking shift position by the applied shifting force without any additional actuation effort being required in the operating state of the actuation unit in which the actuation unit does not actuate the parking lock tappet, and the parking lock is applied. To disengage the parking lock, the parking lock tappet is moved by the actuation unit to its releasing shift position.

According to the invention, the actuation unit is operatively connected to a shift actuator system of a two-speed or higher manual gearbox and is designed to transfer the parking lock tappet from the locking shift position into the releasing shift position in a simple manner by means of spaced-apart shift cams when one of the speeds is engaged in the manual gearbox. In addition, the actuation unit is also designed to release the actuating movement of the parking lock tappet in the direction of the locking shift position when the manual gearbox is in a neutral operating state, in which no speeds are engaged in the manual gearbox and the power flow is interrupted.

In a constructively simple and cost-effective design of the drive device, the drive unit can comprise a longitudinally displaceable gear rack that is formed with a plurality of shift cams. The shift cams can project from one longitudinal side of the gear rack in the direction of the parking lock tappet and can be spaced apart in the shifting direction of the gear rack. It is possible that the gear rack, with one of the shift cams, can interact with the end of the parking lock tappet facing the gear rack when a speed is engaged in the manual gearbox and hold it in the releasing shift position. In addition, it may be provided that the end of the parking lock tappet facing the gear rack is arranged between two shift cams in the neutral operating state of the manual gearbox, preferably resting against the gear rack and the parking lock tappet being in the locking shift position.

This ensures in a simple and effective manner that the parking lock tappet is in the releasing shift position when a speed is engaged, thus preventing the engagement of the parking lock. At the same time, this embodiment of the drive unit according to the invention ensures that the parking lock can be transferred to the engaged operating state when the manual gearbox is in the neutral operating state.

In a further embodiment of the drive device, which is designed to be compact and simple, the drive unit is designed with a shift drum that comprises several shift cams. The shift cams can project in a radial direction from one outer side of the shift drum and can be spaced apart in the circumferential direction of the shift drum. The shift drum can easily interact with one of the shift cams with the end of the parking lock tappet facing the shift drum, holding it in the releasing shift position when a speed is engaged in the manual gearbox. In addition, it may be provided that the end of the parking lock tappet facing the shift drum is arranged between two shift cams in the neutral operating state of the manual gearbox, preferably resting against the shift drum, and the parking lock tappet is in the locking shift position.

The parking lock tappet can be assigned a latching device that automatically engages in the releasing shift position of the parking lock tappet and keeps the parking lock tappet latched in the releasing shift position. This simple design reliably prevents the parking lock from being engaged unintentionally, with little actuation effort required.

The latching device can also comprise an armature of an electromagnet that is loaded in the latching direction by a spring force of a latching spring unit. When the electromagnet is de-energized, the armature can be adjusted by the latching spring unit in the direction of a latching shift position, in which the armature is in active connection with latching elements, via which the parking lock tappet can be held in its releasing shift position in a form-fitting manner. In this embodiment of the parking lock arrangement, the parking lock can be operated with little effort and with low energy consumption.

In addition, a further drive unit according to the invention is proposed with a parking lock arrangement that is cost-effective and compact, can be actuated with little effort and comprises a parking lock gear and a parking lock pawl. The parking lock gear is held in a locked position by the pivoted parking lock pawl and can be rotated by it, and in a release position of the parking lock pawl, it can be rotated. In addition, the parking lock arrangement has a parking lock tappet that can be moved longitudinally between a locking shift position and a releasing shift position. The parking lock tappet is subjected to a shifting force that acts in the direction of the releasing shift position on the parking lock tappet, in which the parking lock tappet releases the positioning movement of the parking lock pawl in the direction of the release position.

Furthermore, the parking lock pawl is held in the locked position by the parking lock tappet when the parking lock tappet is in the locking shift position. The parking lock tappet can be moved into the locking shift position by an actuation unit against the shifting force.

In other words, the parking lock tappet is designed in such a way that, in the operating state of the actuation unit in which the actuation unit does not actuate the parking lock tappet, the applied shifting force moves the parking lock tappet into the releasing shift position without any additional actuation effort, and the parking lock is disengaged. To engage the parking lock, the parking lock tappet is moved by the actuation unit to its locking shift position.

According to the invention, the actuation unit is operatively connected to a shift actuator system of a manual gearbox with at least two speeds. The actuation unit is designed to transfer the parking lock tappet from the releasing shift position to the locking shift position by means of spaced-apart shift cams when the manual gearbox is in a neutral operating state, in which no speeds are engaged in the manual gearbox and the power flow is interrupted. Furthermore, the actuation unit is also designed to release the actuating movement of the parking lock tappet in the direction of the releasing shift position when one of the speeds is engaged in the manual gearbox.

In a simple and cost-effective design of the drive unit, the actuation unit can comprise a longitudinally displaceable gear rack that is designed with a plurality of shift cams. The shift cams can project from one longitudinal side of the gear rack in the direction of the parking lock tappet and be spaced apart in the shifting direction of the gear rack. In this case, it is possible that the gear rack can interact with one of the shift cams with the end of the parking lock tappet facing the gear rack and hold it in the locking shift position when no speed is engaged in the manual gearbox. Furthermore, it may be provided that the end of the parking lock tappet facing the gear rack is arranged between two shift cams in each case, preferably resting against the gear rack, and the parking lock tappet is adjusted to the releasing shift position.

In a further space-saving and cost-effective design of the drive unit, the actuation unit comprises a shift drum that is designed with several shift cams. The shift cams can project in a radial direction from one outer side of the shift drum and can be spaced apart in the circumferential direction of the shift drum. When a speed is engaged in the manual gearbox, the shift drum can interact with the end of the parking lock tappet facing the shift drum using one of the shift cams, holding the tappet in the locking shift position. In addition, it is possible that the end of the parking lock tappet facing the shift drum is arranged between two shift cams in the neutral operating state of the manual gearbox, preferably resting against the shift drum, and the parking lock tappet is in the releasing shift position.

The parking lock tappet can be assigned a latching device that is automatically activated when the parking lock tappet is in the locking shift position and keeps the parking lock tappet locked in the locking shift position. This is a simple and low-effort way to prevent the parking lock from being disengaged unintentionally.

The latching device can comprise an armature of an electromagnet that is acted upon in the latching direction by a spring force of a latching spring unit, which armature is displaced by the latching spring unit in the direction of a latching shift position when the electromagnet is in the de-energized state. In the latching shift position, the armature can be in active connection with latching elements, by means of which the parking lock tappet can be held in its locking shift position in a constructively simple manner with a form fit.

This also ensures in a simple and effective manner that the parking lock tappet is in the releasing shift position when a speed is engaged, thus preventing the parking lock from being engaged. At the same time, this embodiment of the drive unit according to the invention ensures that the parking lock can be transferred to the engaged operating state when the manual gearbox is in the neutral operating state.

The parking lock tappet can also have a conical region with which the parking lock tappet interacts with a tapering bevel of the parking lock pawl during an adjustment of the parking lock pawl in the direction of the locked position. This allows the parking lock pawl to be moved from a position in which the rotational movement of the parking lock gear is released to a position in which the rotational movement of the parking lock gear is blocked, in either direction, and with the desired high resolution. In addition, the two interlocking bevels of the parking lock tappet and the parking lock pawl ensure that jamming, which prevents the engagement and disengagement of the parking lock, is avoided.

The manual gearbox may comprise a three-shaft planetary gear set and at least one form-fitting shift element of the shift actuator system, via which the planetary gear set can be blocked to provide a direct drive. Then the manual gearbox and thus the drive unit according to the invention can be designed with a high power density and at least two different gear ratios can be provided with little design effort. It is possible that the three-shaft planetary gear set is designed with a sun gear, a planetary carrier, and planetary gears arranged on it, and a ring gear.

Furthermore, it is also possible that two form-fitting shift elements of the shift actuator system are assigned to the planetary gear set, via which at least two shafts of the planetary gear set can each be connected alternately to a drive shaft of a drive mechanism and fixed on the housing side to represent three speeds, while the planetary gear set is driven via the third shaft.

The shift actuator system can be designed with an actuator via which the shift element or shift elements and the drive unit can be actuated in a cost-effective and compact manner due to the small number of components of the drive device.

In a drive unit according to the invention that is easy to operate, the speeds of the shafts of the planetary gear set can be synchronized via the drive mechanism, which is preferably designed as an electric machine, during traction-interrupted gear shifts in the manual gearbox.

One output side of the planetary gear set can be connected to a further gearbox unit, which is preferably designed as a spur gear stage, in order to be able to adapt the gear ratios of the manual gearbox to different applications with little design effort and, if necessary, to be able to bridge offsets.

One drive side of the planetary gear set can also be connected to an output shaft of the drive mechanism via an additional gearbox unit, which is preferably designed as a spur gear stage. This means that the manual gearbox can be adapted to different applications in addition to or as an alternative to the further gearbox unit, and that, if necessary, axial offsets can be bridged.

A further aspect of the present invention relates to a drivable vehicle axle that is designed with a drive unit as described in more detail above.

In a further development of the drivable vehicle axle according to the invention, the further gearbox unit can be connected to the driven wheels via an axle differential.

The invention is not limited to the stated combination of features of the independent claims or the dependent claims thereof. Furthermore, there are possibilities for combining individual features, even if they arise from the claims, the subsequent description of embodiments, or directly from the drawing. The reference of the claims to the drawings by using reference signs is not intended to limit the scope of the claims.

BRIEF DESCTIPTION OF THE DRAWINGS

Preferred further embodiments result from the subclaims and the following description. Exemplary embodiments of the implementation of the invention are explained in more detail, without being limited to these, by means of the drawing.

Figure 2:
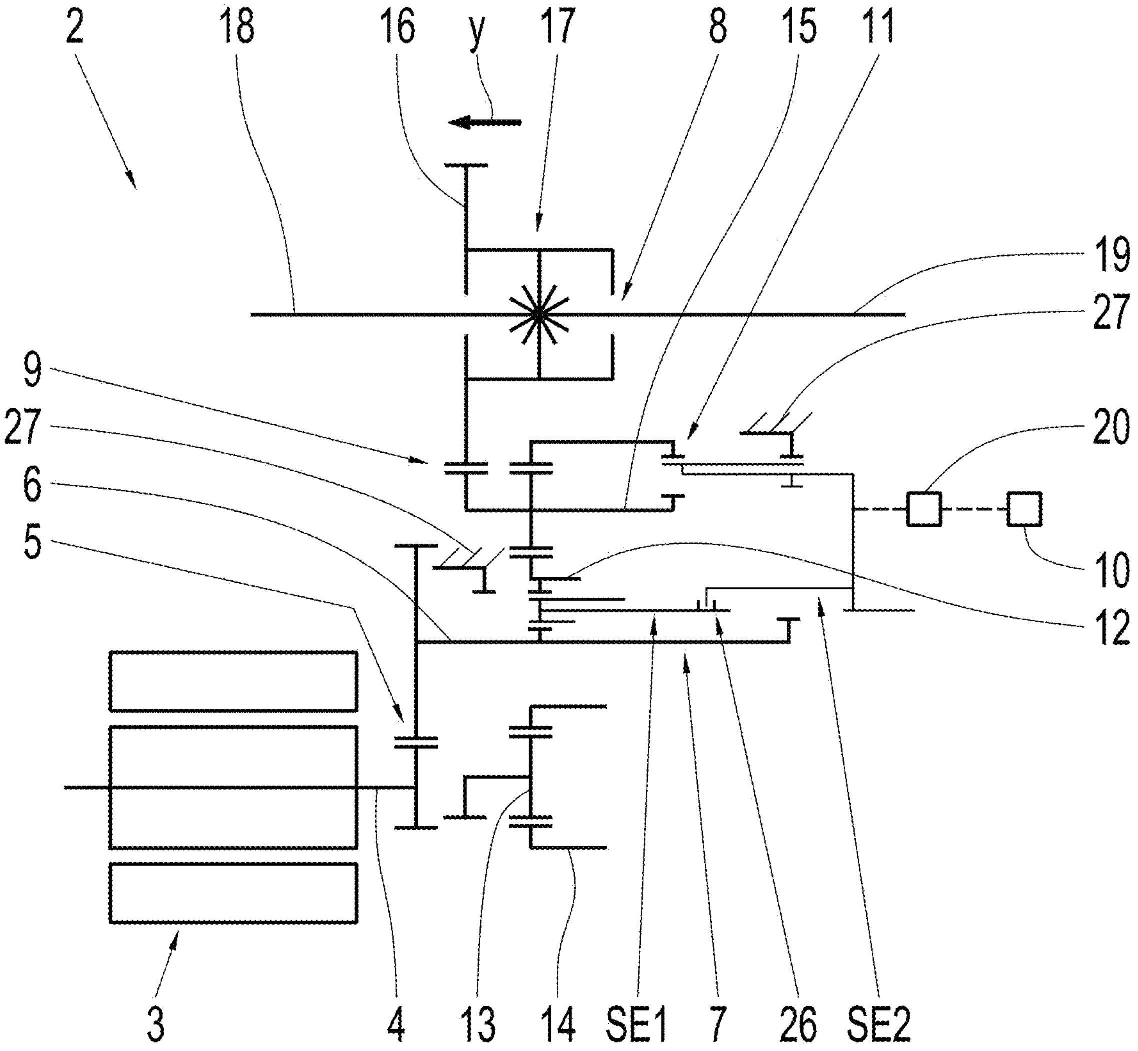
Figure 3:
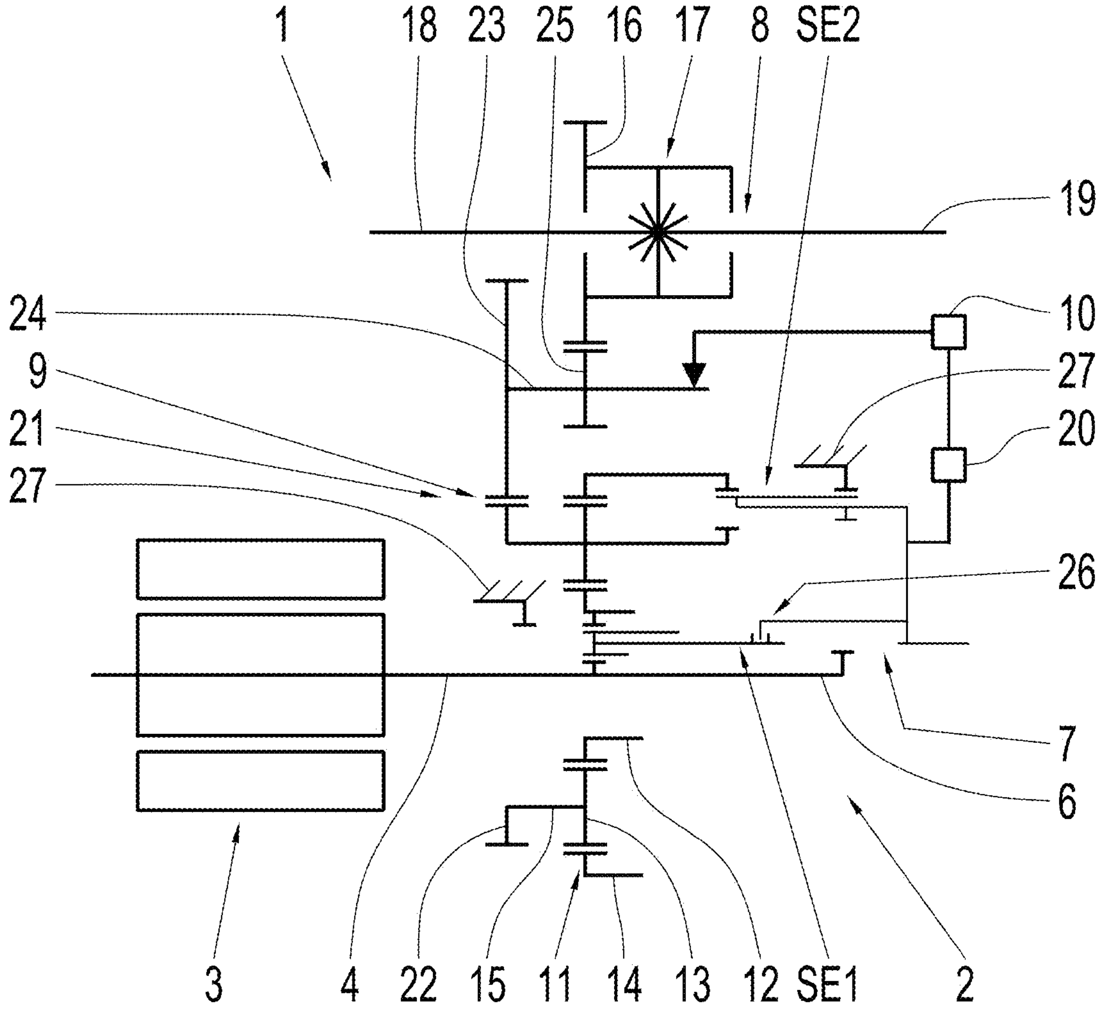
Figure 4A:
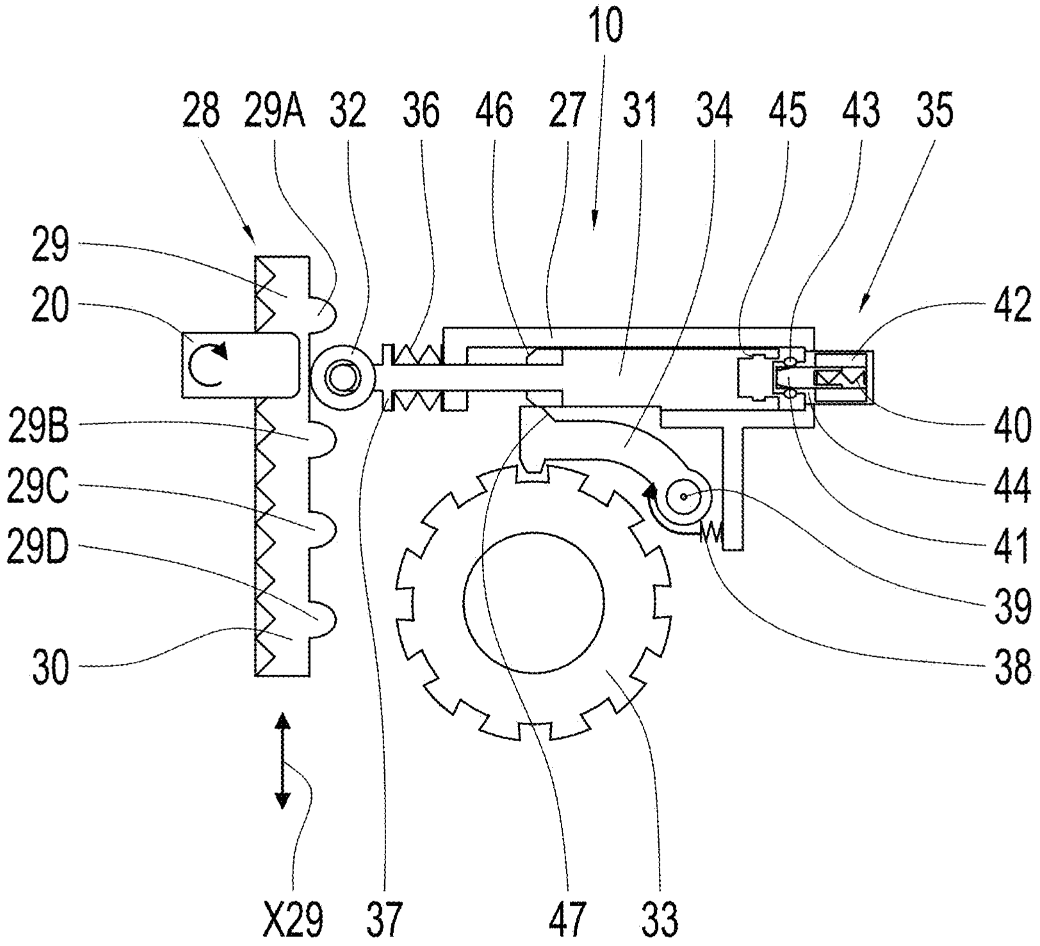
Figure 4B:
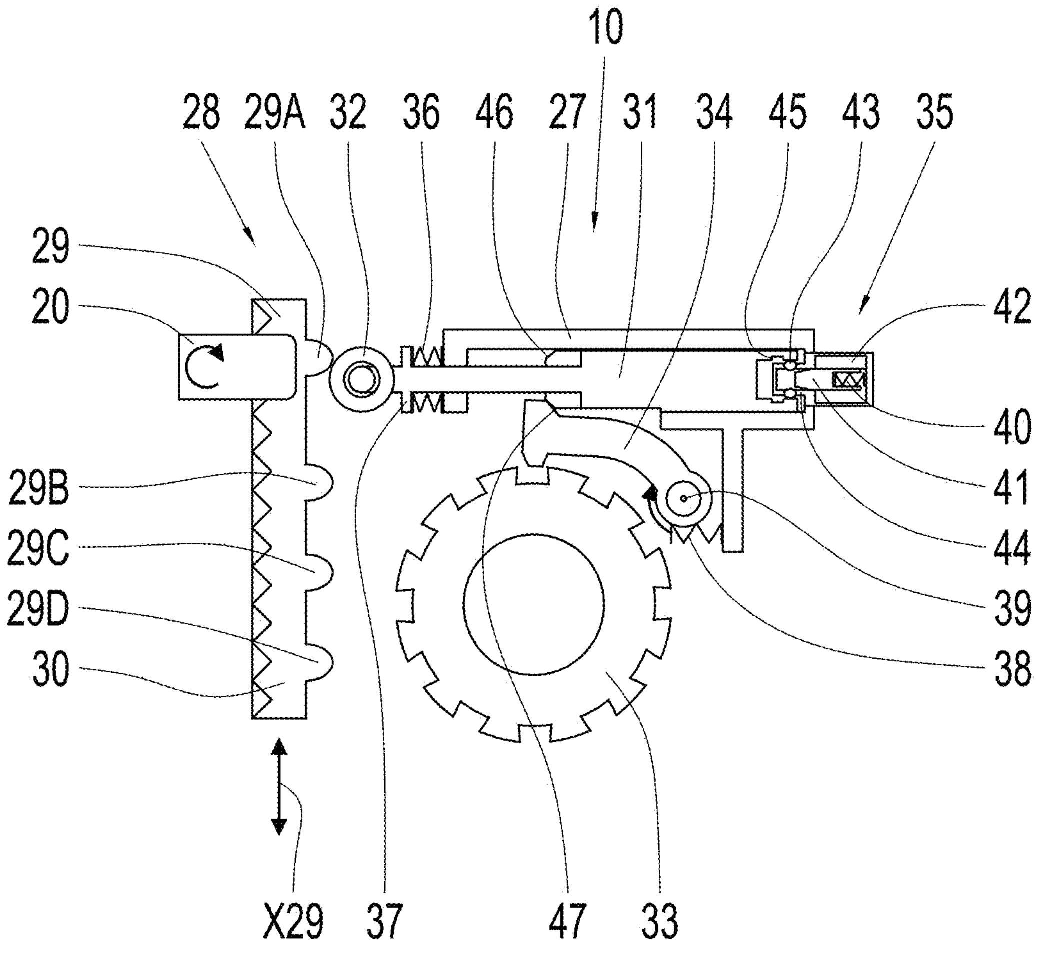

It shows:

FIG. 1 a schematic representation of a drivable vehicle axle;

FIG. 2 a more detailed representation of a first embodiment of the drivable vehicle axle according to FIG. 1;

FIG. 3 a representation of a second embodiment of the drivable vehicle axle according to FIG. 1, corresponding to FIG. 2;

FIG. 4*a* a simplified, isolated view of a parking lock arrangement of the drive unit of the drivable vehicle axle according to FIG. 1 in the engaged state of the parking lock;

FIG. 4*b* a representation of the parking lock arrangement during a disengagement of the parking lock, corresponding to FIG. 4*a;*

Figure 4C:
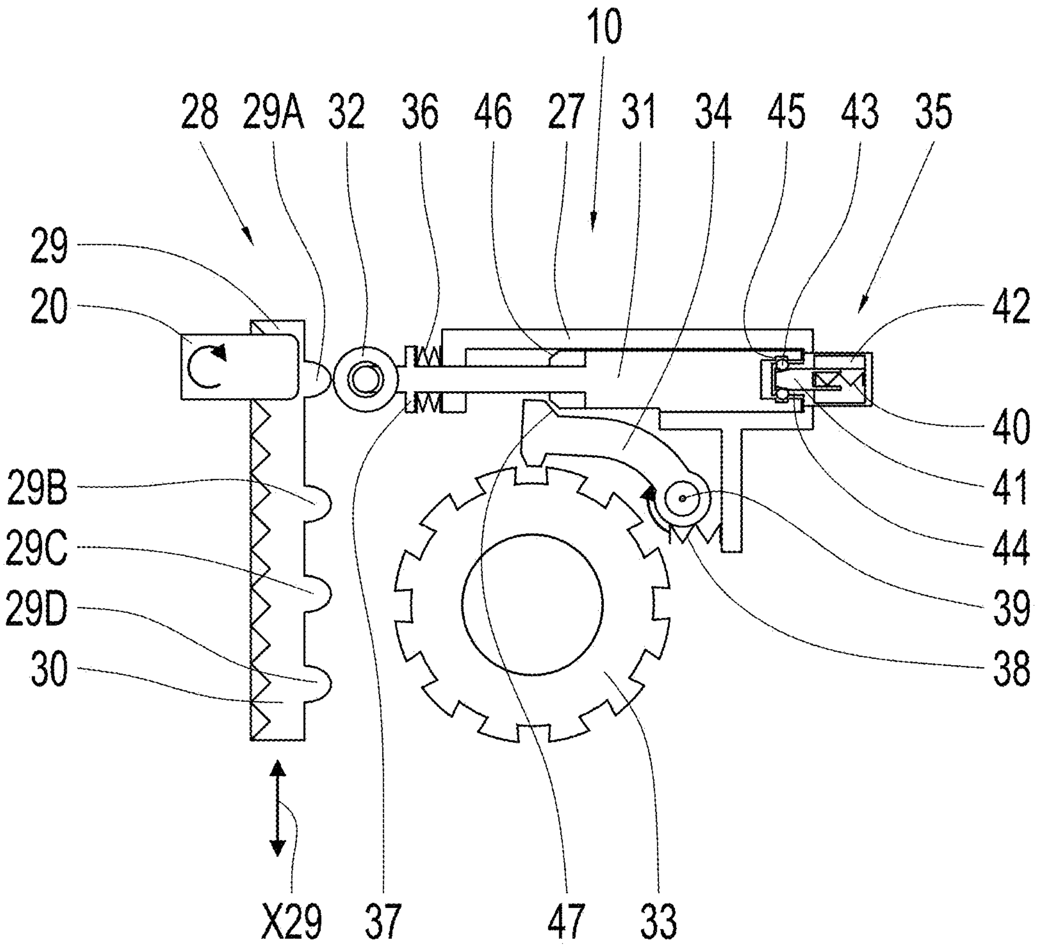

FIG. 4*c* a representation of the parking lock arrangement in the deployed state of the parking lock, corresponding to FIG. 4*a;*

Figure 5A:
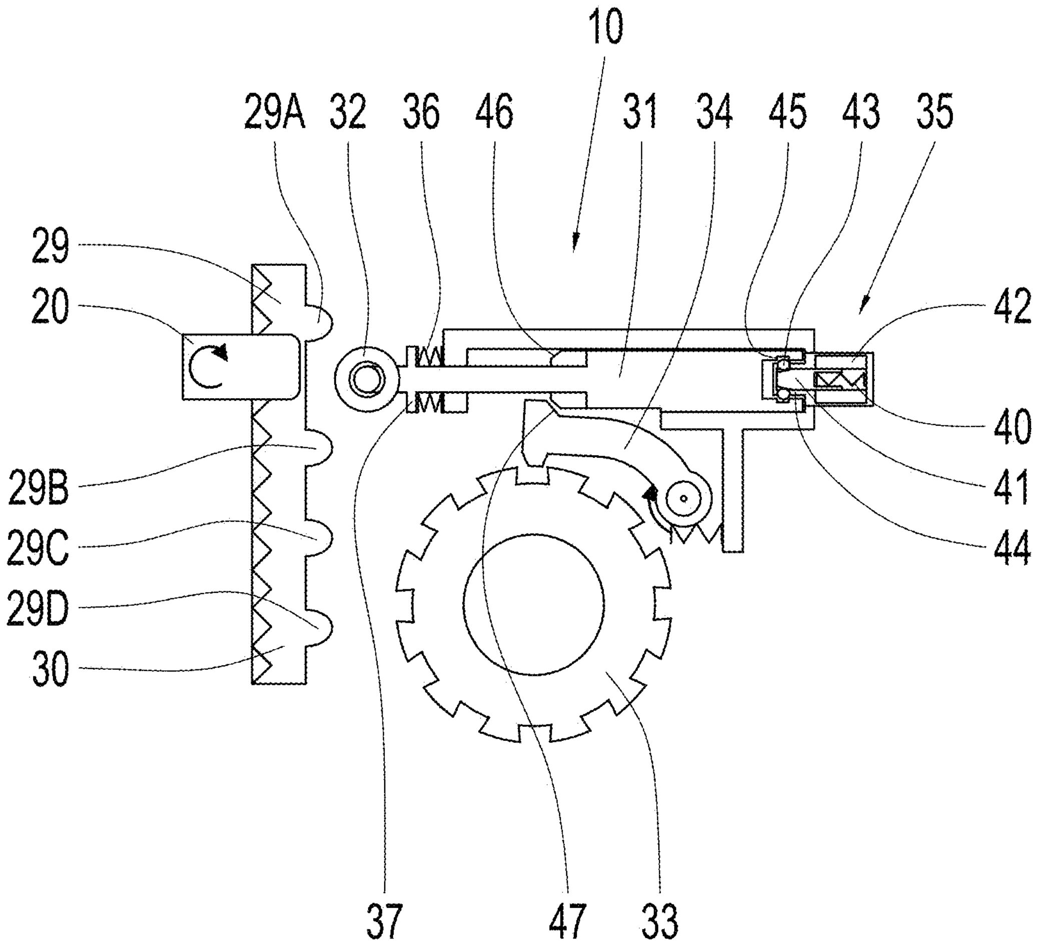

FIG. 5*a* a representation of the parking lock arrangement in a laid-out operating state of the parking lock during a shift operation in the manual gearbox of the drive unit, corresponding to FIG. 4*a;*

Figure 5B:
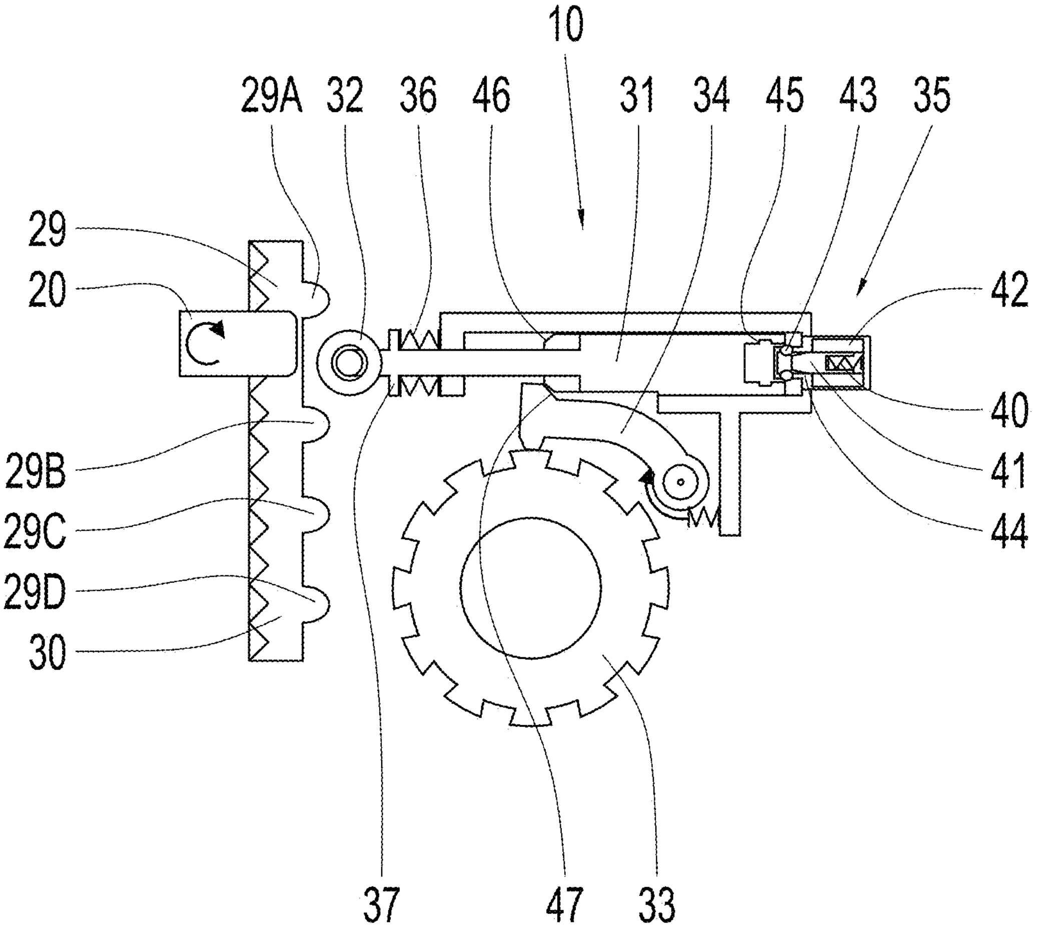

FIG. 5*b* a representation of the parking lock arrangement during an engagement of the parking lock, corresponding to FIG. 5*a;*

Figure 5C:
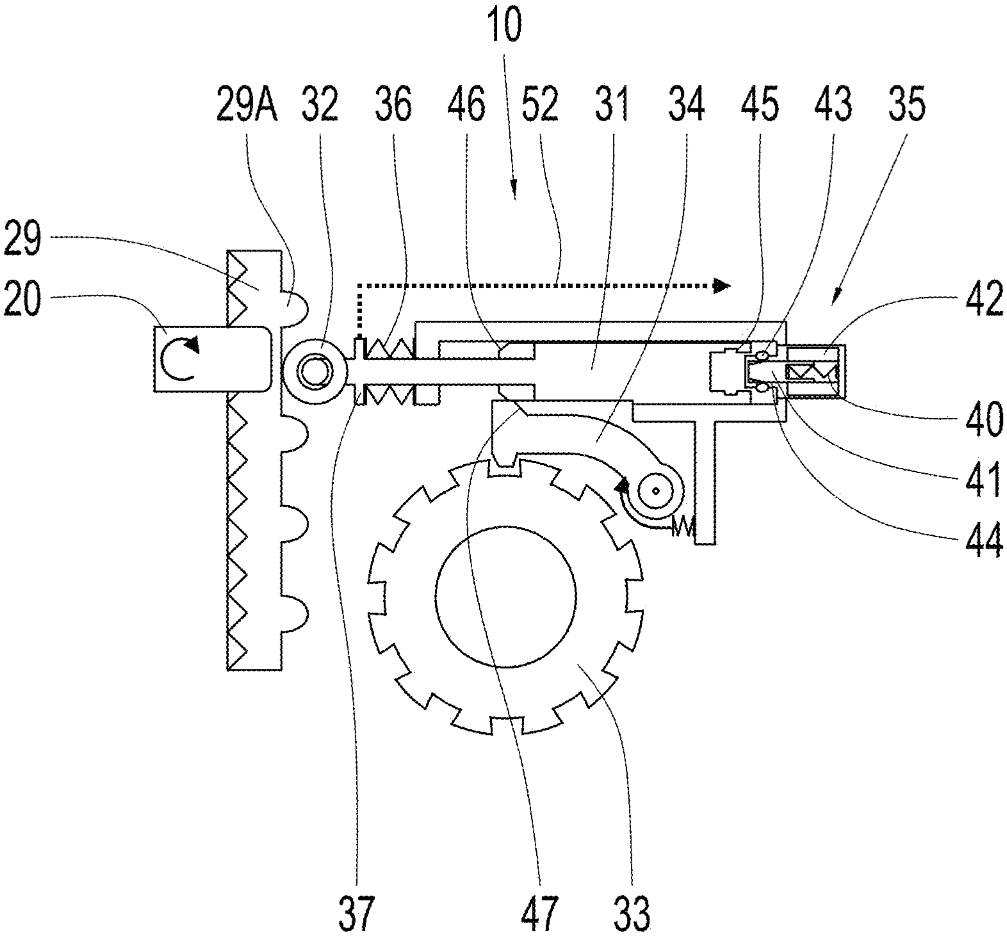

FIG. 5*c* a representation of the parking lock arrangement in inserted operating state of the parking lock, corresponding to FIG. 5*a;*

Figure 6A:
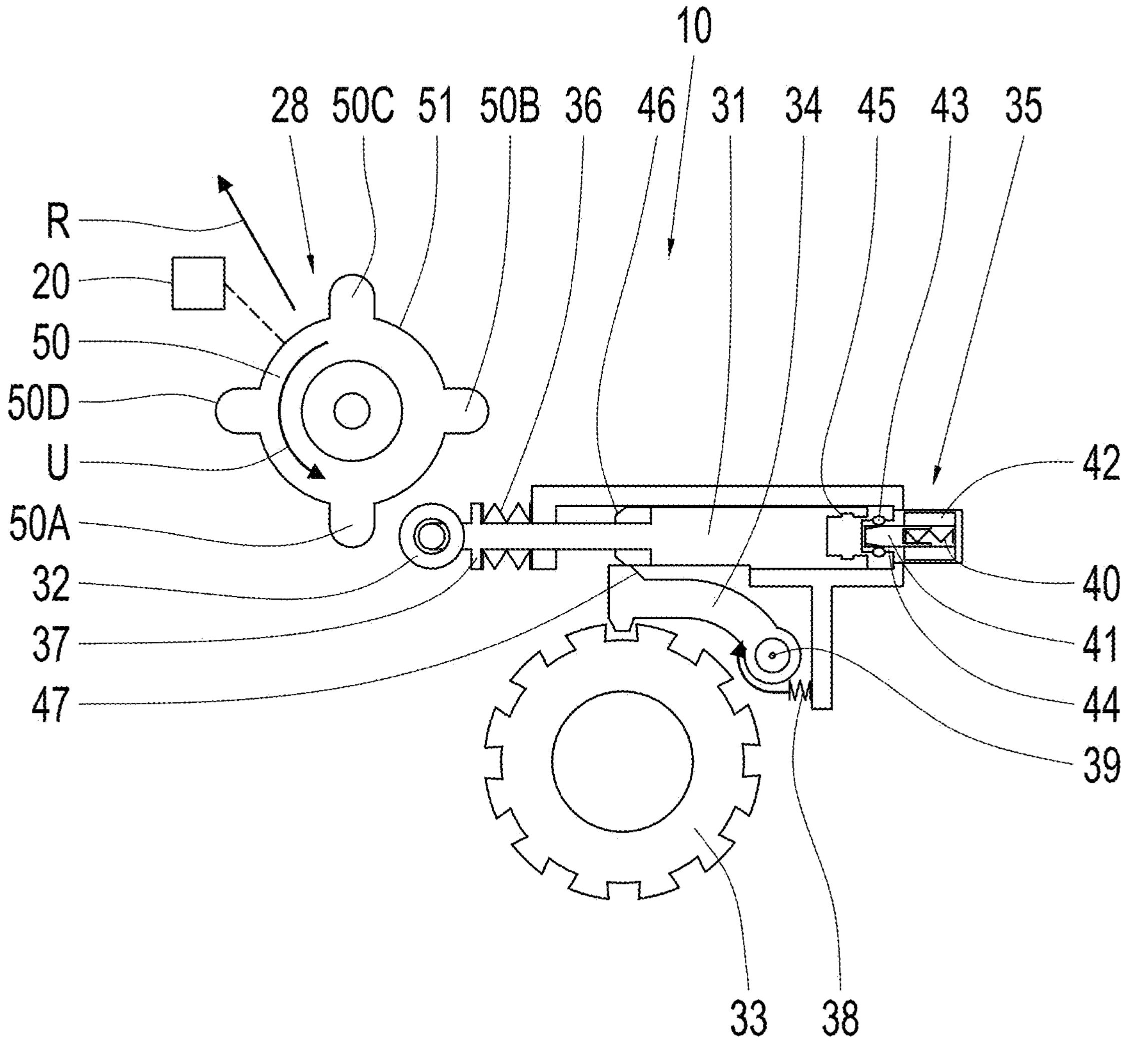

FIG. 6*a* a representation of the second embodiment of the parking lock arrangement in the inserted operating state of the parking lock, corresponding to FIG. 4*a;*

Figure 6B:
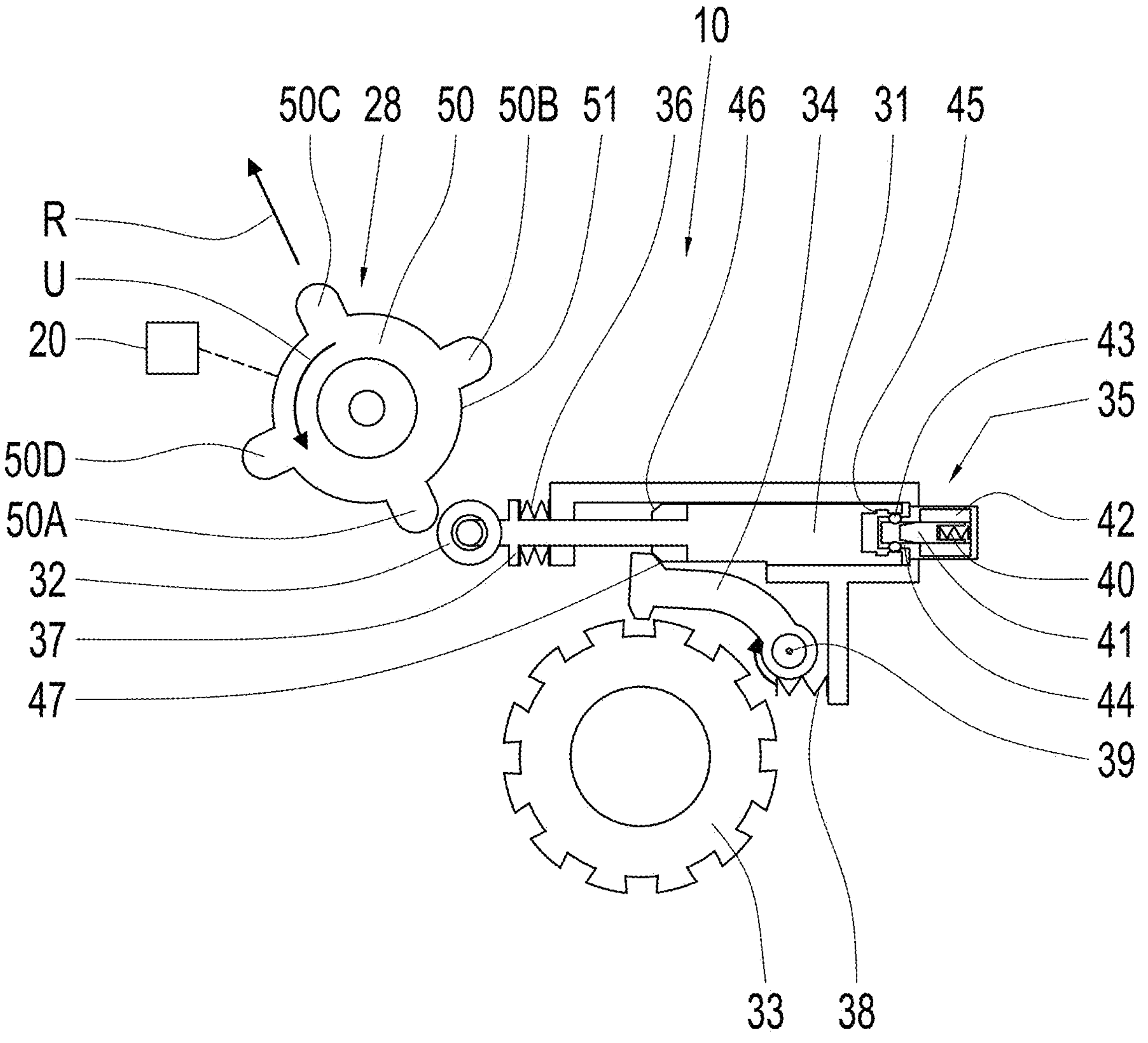

FIG. 6*b* a representation of the second embodiment of the parking lock arrangement during a disengagement of the parking lock, corresponding to FIG. 6*a;*

Figure 6C:
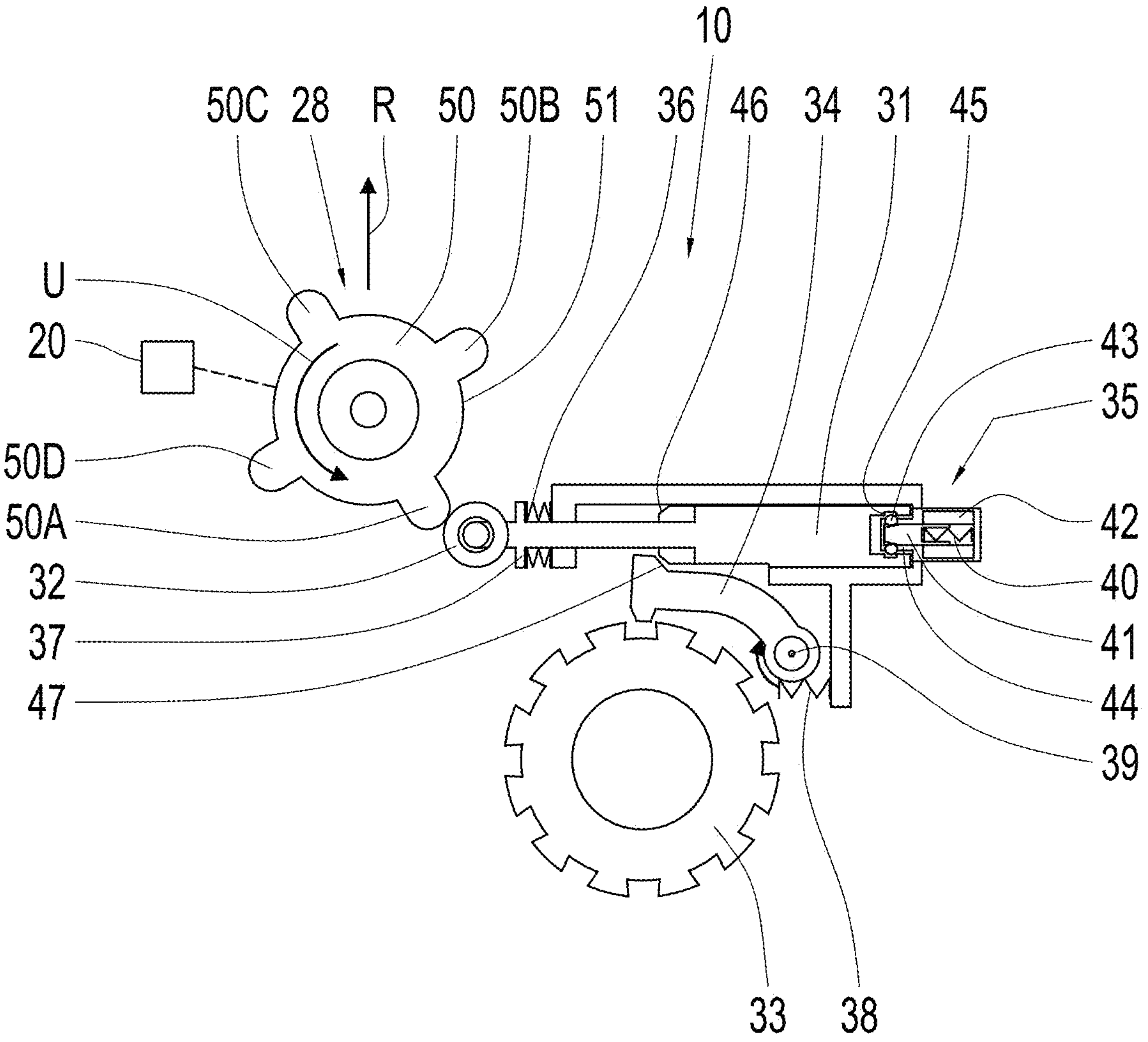

FIG. 6*c* a representation of the parking lock arrangement in the deployed state of the parking lock, corresponding to FIG. 6*a;*

Figure 7A:
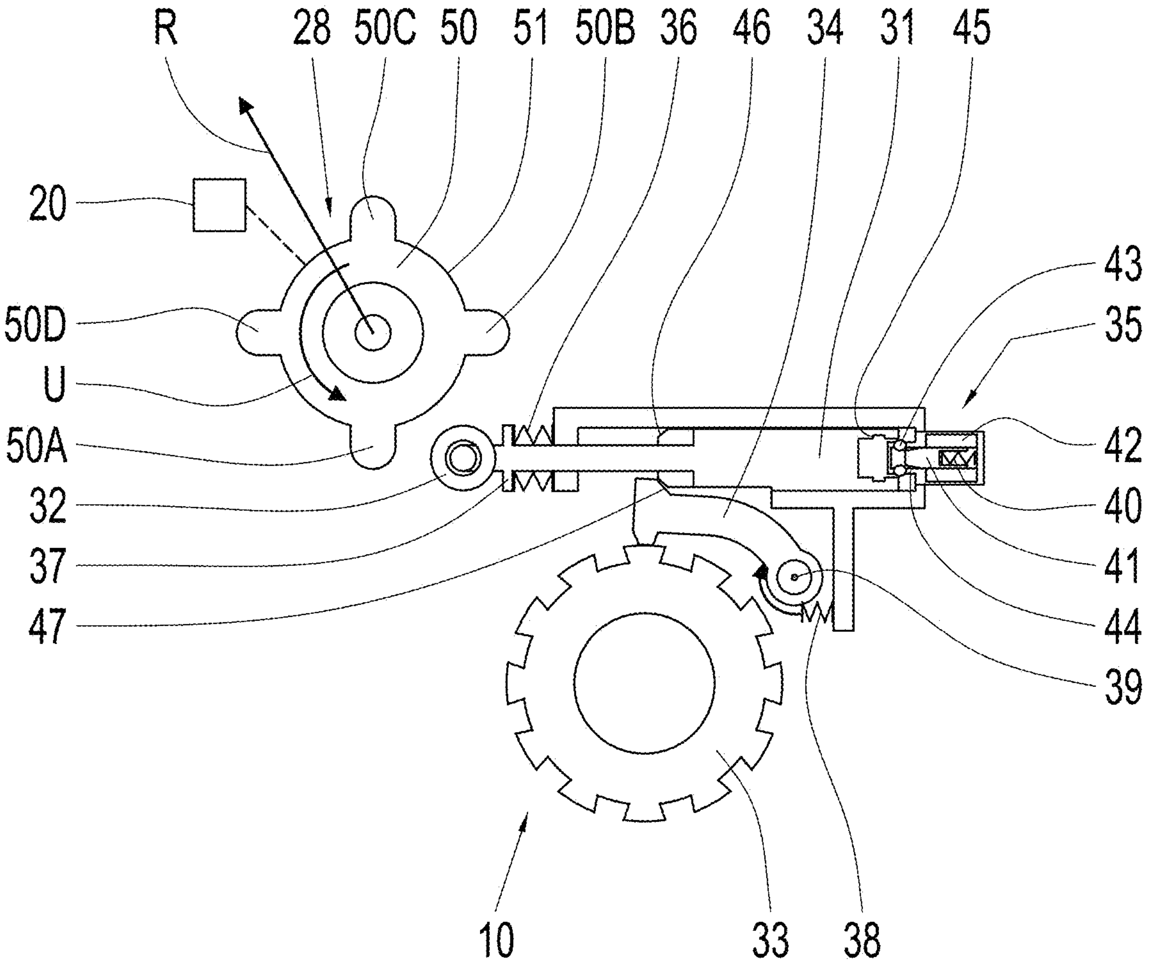
Figure 7B:
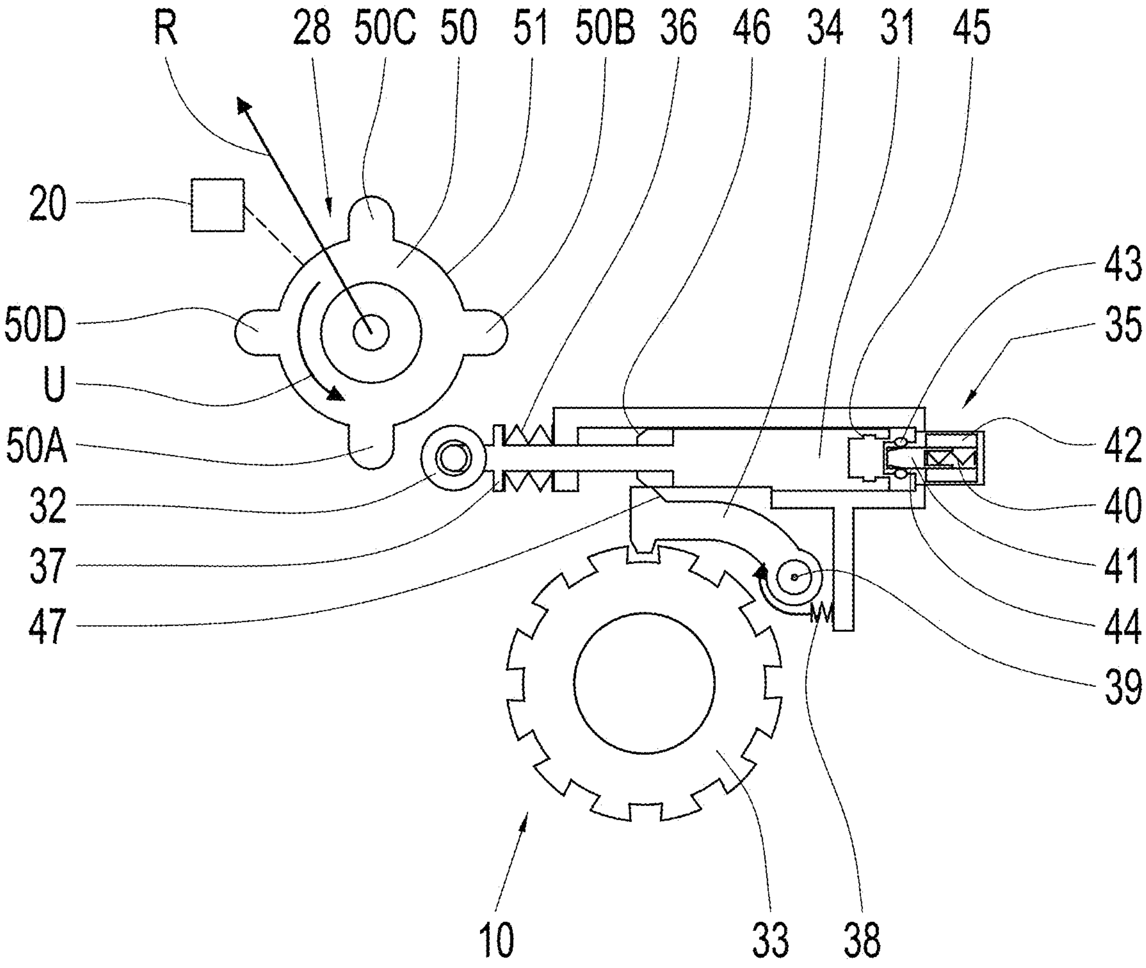

FIG. 7*a* the parking lock arrangement according to FIG. 6*a* during an engagement of the parking lock; and FIG. 7*b* the parking lock arrangement according to FIG. 6*a* with the parking lock engaged.

DETAILED DESCRIPTION

FIG. 1 shows a schematized representation of a drivable vehicle axle 1 with a drive unit 2, which comprises a drive mechanism 3 that can be designed in the present case as an electric motor, as a combination of an electric motor and an internal combustion engine, or as an internal combustion engine. A drive shaft 4 or an output shaft of the drive mechanism 3 can be operatively connected to an input shaft 6 of a manual gearbox 7 via an optional gearbox unit 5, which can be designed, for example, as a spur gear stage. On the output side, the manual gearbox 7 is connected to an output drive 8 of the drivable vehicle axle 1, wherein a further optional gearbox unit 9 can be provided between the manual gearbox 7 and the output drive 8, depending on the application.

A parking lock arrangement 10 is assigned to the manual gearbox 7, by means of which the output drive 8 can be held in a rotationally fixed manner when the manual gearbox 7 is in the neutral operating state. In the neutral operating state of the manual gearbox 7, no speed is engaged in the manual gearbox 7 and the power flow is interrupted between the input shaft 6 and the output drive 8 in the region of the manual gearbox 7.

FIG. 2 shows a first embodiment of the drive unit 2, in which the manual gearbox 7 comprises a three-shaft planetary gear set 11 and two form-fitting shift elements SE1 and SE2. In the illustrated exemplary embodiment, the planetary gear set 11 is designed with a sun gear 12 and planetary gears 13 that mesh with it. Furthermore, the planetary gear set 11 includes a ring gear 14 that is in mesh with the planetary gears 13. The planetary gears 13 are rotatably mounted on a planetary carrier 15. The sun gear 12 is connected to the output shaft 4 of the drive mechanism 3 via the gearbox unit 5, which is designed here as a spur gear stage, in various shift positions of the first shift element SE1. In addition, planetary carrier 15, which in this case represents the output drive of manual gearbox 7, is permanently connected to output drive 8 via the further gearbox unit 9, which is also designed as a spur gear stage. A spur gear 16 of the further gearbox unit 9 is firmly connected to a cage of an axle differential 17 of the output drive 8, the output shafts 18, 19 which run in the transverse direction Y of the vehicle to driving wheels of the drivable vehicle axle 1.

The two shift elements SE1 and SE2 can be displaced by a common actuator 20 in the manner described in more detail below, in order to be able to represent three different speeds via the manual gearbox 7. The speed changes are carried out with an interruption in tractive force, and differences in speed between the respective interconnected shafts of the planetary gear set 11 are equalized or synchronized by appropriate actuation of the drive mechanism 3.

In addition, the parking lock arrangement 10 is also actuated by actuator 20 in the manner described in more detail below in order to engage the parking lock in the neutral operating state of the manual gearbox 7 and to transfer it to the engaged state when a speed is engaged in the manual gearbox 7.

In the present case, the parking lock arrangement 10, when the parking lock is engaged, blocks a rotational movement of the planetary carrier 15 of the manual gearbox 7 and thus the output drive 8.

FIG. 3 shows a representation of a further embodiment of the drive unit 2, which corresponds to FIG. 2 and is designed without the gearbox unit 5. This means that the output shaft 4 of the drive mechanism 3 can be connected to the sun gear 12 via the first shift element SE1 of the manual gearbox 7, which has the same structure as the manual gearbox 7 of the drive unit 2 according to FIG. 2. In addition, the further gearbox unit 9 has a further spur gear stage 21, which comprises a first spur gear 22 connected in a rotationally fixed manner to the planetary carrier 15 and a further spur gear 23 meshing with it. The further or second spur gear 23 is connected to an intermediate shaft 24 in a torsion-resistant manner, to which a third spur gear 25 is coupled in the same way. The third spur gear 25 meshes with the spur gear 16, which is connected to the axle differential 17 in a rotationally fixed manner.

The two shift elements SE1 and SE2 are operatively connected to each other in a connection region 26. The connection region 26 is designed in such a way that the two shift elements SE1 and SE2 can be displaced together in the axial direction of the planetary gear set 11 by the actuator 20, but these shift elements can be rotated relative to each other.

In the shift positions of the shift elements SE1 and SE2 shown in FIG. 2 and FIG. 3, the first speed is engaged in the manual gearbox 7. The first shift element SE1 connects the output shaft 4 of the drive mechanism 3 with the sun gear 12 of the planetary gear set 11, while the second shift element SE2 connects the ring gear 14 with a housing 27 of the drive unit 2 and the ring gear 14 is non-rotatable.

If a gear change is requested, during which second speed is to be engaged in the manual gearbox 7 from first speed, the two shift elements SE1 and SE2 are first moved to a second shift position, in which no speed is engaged in the manual gearbox 7 and the manual gearbox 7 is in the neutral operating state. In the second shift position of shift elements SE1 and SE2, the first shift element SE1 still connects output shaft 4 of drive mechanism 3 to the sun gear 12. In contrast, in the second shift position of the second shift element SE2, the operative connection between the ring gear 15 and the housing 27 is released or canceled and the ring gear 14 can rotate freely. In this operating state of the manual gearbox 7, the speed of the sun gear 12 is reduced by the corresponding actuation of the drive mechanism 3, or the sun gear 12 is braked until the sun gear 12 can be connected to the housing 27 via the first shift element SE1. The sun gear 12 is connected to the housing 27 when the two shift elements SE1 and SE2 are in the third shift position. In the third shift position of the second shift element SE2, the ring gear 14 can still be freely rotated.

After that, the two shift elements SE1 and SE2 are moved to their fourth shift position and second speed is engaged in the manual gearbox 7. In the fourth shift position, the first shift element SE1 connects the sun gear 12 to the housing 27 and holds the sun gear 12 in a rotationally fixed manner. In the fourth shift position, the second shift element SE2 connects the output shaft 4 of the drive mechanism 3 with the ring gear 14 in a rotationally fixed manner. The planetary gear set 11 is then driven via the ring gear 14, while the planetary gear set 11 is still driven via the planetary carrier 15.

To engage third speed from second in manual gearbox 7, the two shift elements SE1 and SE2 are to be moved from their fourth shift positions to a fifth shift position. In the fifth shift position of the first shift element SE1, the connection between the housing 27 and the sun gear 12 is disconnected. The output shaft 4 of the drive mechanism 3 is connected to the ring gear 14 in the fifth shift position of the second shift element SE2. In this operating state, the manual gearbox 7 is again in the neutral operating state, in which the speeds of the planetary gear set 11 can be matched via the drive mechanism 3 so that the third speed can be engaged in the manual gearbox 7. To do this, the rotational speed of the ring gear 14 of the drive mechanism 3 is controlled by a corresponding control of the rotational speed of the drive mechanism 3 to a rotational speed level at which the shift elements SE1 and SE2 can be transferred to their sixth shift position.

In the sixth shift position of the first shift element SE1, the first shift element SE1 does not establish an effective connection between the housing 27 and the sun gear 12 or between the sun gear 12 and the output shaft 4 of the gearbox unit 3. In the sixth shift position, the second shift element SE2 couples the output shaft 4 of the drive mechanism 3 with the ring gear 14 and the planetary carrier 15, whereby the planetary gear set 11 is blocked and the third speed, which is a so-called direct drive, is engaged in the manual gearbox 7.

In the second exemplary embodiment of the drive unit 2, shown in FIG. 3, the parking lock arrangement 10 is also actuated by means of the common actuator 20 of the two shift elements SE1 and SE2 in the manner described in more detail below and blocks the rotational movement of the intermediate shaft 24 when no speed is engaged in the manual gearbox 7 and the parking lock arrangement 10 is activated accordingly.

FIG. 4*a* through FIG. 4*c* each show a simplified sole representation of a first embodiment of the parking lock arrangement 10, which comprises an actuation unit 28 with a longitudinally displaceable gear rack 29. The gear rack 29 is formed with several shift cams 29A through 29D, which, starting from one longitudinal side 30 of the gear rack 29, project in the direction of a parking lock tappet 31 and are spaced apart from one another in the shifting direction X29 of the gear rack 29. When a speed is engaged in the manual gearbox 7, the gear rack 29 works with one of the shift cams 29A through 29D with the end 32 of the parking lock tappet 31 facing the gear rack 29.

In addition to the parking lock tappet 31, the parking lock arrangement 10 includes a parking lock gear 33, which, in the first embodiment of the drive unit 2 according to FIG. 2, is connected to the planetary carrier 15 in a rotationally fixed manner and, in the second embodiment of the drive unit 2 according to FIG. 3, is seated in a rotationally fixed manner on the intermediate shaft 24.

In this case, the parking lock gear 33 can be held in a non-rotatable manner by a rotatably mounted parking lock pawl 34, which is shown in FIG. 4*a*, when the parking lock pawl 34 is in a locking position, and can be rotated by the parking lock pawl when the parking lock pawl is in a release position, which is essentially shown in FIG. 4*b* and FIG. 4*c*, respectively. In addition, the parking lock tappet 31 is designed to be longitudinally displaceable in the housing 27 between a locking shift position, in which the parking lock tappet 31 is shown in FIG. 4*a*, and a releasing shift position, which the parking lock tappet 31 has in FIG. 4*c*. In addition, a shifting force acts on the parking lock tappet 31 in the present case, which displaces the parking lock tappet 31 in the direction of its locking shift position when the actuating movement is released by the gear rack 29 and a latching device 35 assigned to the parking lock tappet 31.

The shifting force applied to the parking lock tappet 31 in the direction of its first shift position on the parking lock tappet 31 corresponds in this case to a spring force of a spring unit 36, which is shouldered at one end on the housing 27 and at the other end on a collar 37 of the parking lock tappet 31 and is designed as a compression spring.

When the parking lock tappet 31 is in the locking shift position, the parking lock pawl 34 is held in its locking position by the parking lock tappet 31 against a shifting force that acts on the parking lock pawl 34 in the direction of the release position of the parking lock pawl 34. The shifting force acting on the parking lock pawl 34 corresponds to a spring force of a further spring unit 38, which acts around a pivot axis 39 of the parking lock pawl 34 to engage it.

The parking lock tappet 31 can be moved by the actuation unit 28 against the spring force of the spring unit 36 into the releasing shift position, in which the parking lock tappet 31 releases the setting movement of the parking lock pawl 34 in the direction of the release position.

The actuation unit 28 is operatively connected to the shift actuator system of the manual gearbox 7, which has the two shift elements SE1 and SE2 and encompasses the actuator 20, and is designed to transfer the parking lock tappet 31 from the locking shift position into the releasing shift position by means of the spaced-apart shift cams 29A through 29D when one of the three speeds is engaged in the manual gearbox 7. In addition, the actuation unit 28 is designed to release the actuating movement of the parking lock tappet 31 in the direction of the locking shift position when the manual gearbox 7 is in its neutral operating state.

In this case, the gear rack 29 acts together with one of the shift cams 29A through 29D with the end 32 of the parking lock tappet 31 facing the gear rack 29 and holds it in the releasing shift position when one of the three speeds is engaged in the manual gearbox 7. In the neutral operating state of the manual gearbox 7, the end 32 of the parking lock tappet 31 facing the gear rack 29 is arranged between two of the shift cams 29A through 29D and the parking lock tappet 31 is moved into its locking shift position.

FIG. 5*a* through FIG. 5*c* show the parking lock arrangement 10 according to FIG. 4*a*, starting from a deployed operating state of the parking lock up to an engaged state of the parking lock in the neutral operating state of the manual gearbox 7. In this context, FIG. 5*a* initially shows the extended operating state of the parking lock during a shifting operation of the manual gearbox 7, which is in the neutral operating state. The parking lock tappet 31 is held by a latching device 35 in the releasing shift position against the spring force of the spring unit 36. For this purpose, the latching device 35, which automatically latches in the releasing shift position of the parking lock tappet 31 and holds the parking lock tappet 31 latched in the second shift position, comprises an armature 41 that is loaded in the latching direction with a spring force of a latching spring unit 40. When the electromagnet 42 is de-energized, the armature 41 is moved by the detent spring unit 40 in the direction of a latching shift position, which is shown in FIG. 5*a* and FIG. 5*c*. In the latching shift position, the armature 41 is in active connection with latching elements 43, which are designed as ball elements in this case and by means of which the parking lock tappet 31 can be held in its second shift position in a form-fitting manner.

For this purpose, the latching elements 43 are held in the axial direction of the latching device 35 in a cylindrical cage 44 and, in the latching shift position of the armature 41, interact in the radial direction with the outside of the armature 41 in such a way that the latter are pushed radially outwards through openings in the cage 44 and held in this position. When the parking lock tappet 31 is in the releasing shift position, the latching elements 43 engage in an internal groove 45 of the parking lock tappet 31 and prevent the parking lock tappet 31 from moving longitudinally in the direction of its locking shift position. In the process, the spring-loaded armature 41 pushes the latching elements 43 radially outwards and holds them in the internal groove 45 of the parking lock tappet 31.

When the parking lock is requested, the parking lock's electromagnet 42 of the latching device 35 is energized accordingly and the armature 41 is attracted against the spring force of the spring unit 40. This causes the latching elements 43 to collapse radially inwards and the form fit between the cage 44 and the internal groove 45 of the parking lock tappet 31 is released. The spring force of the spring unit 36 acting on the parking lock tappet 31 moves the parking lock tappet 31 into its locking shift position. The parking lock is engaged when the parking lock tappet 31 is in its locking shift position as shown in FIG. 5*c* and when its conical region 46 interacts with the parking lock tappet 31, during an adjustment of the parking lock pawl 34 in the direction of the locking shift position, and with a tapering bevel 47 of the parking lock pawl 34. and the parking lock pawl 34 is transferred to and held in the locking position.

When the parking lock is disengaged, one of the shift cams 29A through 29D moves the parking lock tappet 31 to its releasing shift position. As soon as the parking lock tappet 31 comes into contact with the latching elements 43 with its end facing the latching device 35, the parking lock tappet 31 pushes the latching elements 43 radially inwards, wherein the armature 41 is then adjusted by the latching elements 43 in the axial direction against the spring force of the latching spring unit 40. As soon as the parking lock tappet 31 comes into contact with the internal groove 45 of the latching elements 43, the latching elements 43 move radially outwards in the direction of the internal groove 45, since the latching elements 43 are pushed outwards by the spring-loaded armature 41 during an axial positioning movement of the armature 41 in the direction of the parking lock tappet 31. The latching device 35 thus automatically latches in the second shift position of the parking lock tappet 31 and holds it in the releasing shift position as long as the electromagnet 42 is de-energized.

However, the parking lock tappet 31 only moves completely into its locking shift position after a tooth-on-tooth contact between the parking lock gear 33 and the parking lock pawl 34, as shown in FIG. 5*b*, has been released by a corresponding rotational movement of the parking lock gear 33 relative to the parking lock pawl 34.

FIG. 6*a* through FIG. 6*c* show a representation corresponding to FIG. 4*a* of a second embodiment of the parking lock arrangement 10, which has essentially the same design as the parking lock arrangement 10 according to FIG. 4*a*. The parking lock arrangement 10 according to FIG. 6*a* differs from the parking lock arrangement 10 according to FIG. 4*a* in that it comprises a shift drum 50 instead of the gear rack 29. The shift drum 50 is formed with a plurality of shift cams 50A through 50D, which, starting from an outer side 51, project in the radial direction R and are spaced apart from one another in the circumferential direction U of the shift drum 50.

In this case, the shift drum 50 acts together with one of the shift cams 50A through 50D with the end 32 of the parking lock tappet 31 facing the shift drum 50 and holds it, like the gear rack 29. with the shift cams 29A through 29D in the releasing shift position when one of the three speeds is engaged in the manual gearbox 7. In contrast to this, the end 32 of the parking lock tappet 31 facing the shift drum 50 is arranged in the neutral operating state of the manual gearbox 7 between two of the shift cams 50A through 50D and the parking lock tappet 31 is in the locking shift position.

FIG. 6*b* shows the parking lock arrangement 10 during a parking lock disengagement, during which the parking lock tappet 31 is displaced by the shift cam 50D from its locking shift position into its releasing shift position and is increasingly brought into engagement with the latching device 35. In the operating state shown in FIG. 6*c*, the parking lock is disengaged and the parking lock pawl 34 is disengaged from the parking lock gear 33. The parking lock tappet 31 is held in its releasing shift position by the latched latching device 35 as long as the electromagnet 42 is not energized.

In FIG. 7*a*, the parking lock arrangement 10 according to FIG. 6*a* is shown in an operating state during which the parking lock is being transferred from the extended operating state to the engaged operating state. The electromagnet 42 is energized for this purpose and pulls the armature 41 out of engagement with the latching elements 43 so that they can collapse radially inwards. The parking lock tappet 31 has already been moved by the spring unit 36 out of its releasing shift position and towards the locking shift position, and its conical region 46 is in contact with the tapering bevel 47 of the parking lock pawl 34. Since the parking lock gear 33 and the parking lock pawl 34 are in a so-called tooth-on-tooth position in the operating state shown in FIG. 7*a*, the parking lock pawl 34 can only engage in the toothing of the parking lock gear 33 with a latching action when the parking lock gear 33 performs a corresponding rotational movement. This operating state is shown in FIG. 7*b*, in which the parking lock pawl 34 engages in a form-fitting manner with the external teeth of the parking lock gear 33, thus engaging the parking lock.

If the power supply to the latching device 35 fails, a so-called supercapacitor can be used to supply power to the electromagnet 42 and deactivate the latching device 35. This is possible because the manual gearbox 7 does not need to be synchronized and the parking lock can always be engaged in the neutral operating state of the manual gearbox 7.

Furthermore, it is possible to manually release the parking lock, for example if a vehicle breaks down. For this purpose, a Bowden cable 52 is provided, which is only shown schematically in FIG. 5*c*, and which in the present case acts on the collar 37 of the parking lock tappet 31. The spring unit 36 can be wound up and the parking lock tappet 31 can be moved to its releasing shift position by means of the Bowden cable 52 until the parking lock tappet 31 is held by the latching device 35. Since the manual gearbox 7 is already in the neutral operating state, the output drive 8 is decoupled from the drive mechanism 3 and can rotate freely.

Depending on the respective application, it may also be intended that the spring force of the spring unit 36 acts in the direction of the releasing shift position and the parking lock tappet 31 can be adjusted by the actuation unit 28 via the shift cams 29A through 29D or 50A through 50D against the spring force of the spring unit 36 in the direction of its releasing shift position and can be locked in the releasing shift position by the latching device 35.

LIST OF REFERENCE NUMERALS

1 Drivable axle
2 Drive unit
3 Drive mechanism
4 Output shaft
5 Gearbox unit
6 Input shaft
7 Manual gearbox
8 Output drive
9 Further gearbox unit
10 Parking lock arrangement
11 Planetary gear set
12 Sun gear
13 Planetary gear
14 Ring gear
15 Planetary carrier
16 Spur gear of the further gearbox unit 9
17 Axle differential
18, 19 Output shaft of the axle differential
20 Actuators
21 Further spur gear stage of the further gearbox 9
22 First spur gear
23 Further spur gear
24 Intermediate shaft
25 Third spur gear
26 Connection region of shift elements SE1 and SE2
27 Housing of the drive unit
28 Actuation unit
29 Gear rack
29A through 29D Shift cams of the gear rack
30 Longitudinal side of the gear rack
31 Parking lock tappet
32 End of the parking locking tappet
33 Parking lock gear
34 Parking lock pawl
35 Latching device
36 Spring unit of the parking lock tappet
37 Parking lock tappet collar
38 Further spring unit for the parking lock pawl
39 Pivot axis of the parking lock pawl
40 Latching spring unit
41 Armature
42 Electromagnet
43 Latching elements
44 Cage
45 Internal groove of the actuation tappet
46 Conical region of the parking lock tappet
47 Tapering bevel of the parking lock pawl
50 Shift drum
50A through 50D Shift cam of the shift drum
51 Outer side of the shift drum
52 Bowden cable SE1 First shift element SE2 Second shift element R Radial direction of the shift drum U Circumferential direction of the shift drum X29 Shifting direction of the gear rack

The invention claimed is:

1. A drive unit with a parking lock arrangement, comprising:

a parking lock gear, which can be held in a rotationally fixed manner by a rotatably mounted parking lock pawl in a locking position of the parking lock pawl and which can be rotated in a release position of the parking lock pawl;

a parking lock tappet configured to be longitudinally displaceable between a locking shift position and a releasing shift position and to be acted upon by a shifting force, to engage the parking lock tappet in a direction of the locking shift position; and an actuation unit operatively connected to a shift actuator system of a manual gearbox having at least two speeds;

wherein the parking lock pawl is held in the locking position by the parking lock tappet when the parking lock tappet is in the locking shift position; and wherein the parking lock tappet can be transferred by the actuation unit against the shifting force into the releasing shift position, in which the parking lock tappet releases the actuating movement of the parking lock pawl in the direction of the release position;

wherein the actuation unit comprises a shift drum with a plurality of mutually spaced shift cams, the shift drum rotating on an axis parallel to an axis of rotation of the parking lock gear, with one of the shift cams directly interacting with the end of the parking lock tappet that is longitudinally aligned with the shift drum;

wherein the actuation unit is configured to transfer the parking lock tappet by means of the mutually spaced shift cams from the locking shift position into the releasing shift position when one of the at least two speeds is engaged in the manual gearbox, and to release the actuating movement of the parking lock tappet in the direction of the locking shift position when the manual gearbox is in a neutral operating state in which none of the at least two speeds is engaged in the manual gearbox and the power flow is interrupted.

2. The drive unit according to claim 1, wherein:

the shift cams project in a radial direction starting from an outer side of the shift drum and are spaced apart from one another in the circumferential direction of the shift drum; and the shift drum, with one of the shift cams in the manual gearbox engaged in each case, interacts with the end of the parking lock tappet facing the shift drum and holds the latter in the releasing shift position and the end of the parking lock tappet facing the shift drum in the neutral operating state of the manual gearbox in each case between two shift cams, and the parking lock tappet is in the locking shift position.

3. The drive unit according to claim 1, comprising a latching device assigned to the parking lock tappet and configured to be automatically activated when the parking lock tappet is in the releasing shift position to maintain the parking lock tappet latched in the releasing shift position.

4. The drive unit according to claim 1, wherein the parking lock tappet has a conical region, by means of which the parking lock tappet interacts with a tapering bevel of the parking lock pawl during an adjustment of the parking lock pawl in the direction of the locking position.

5. The drive unit according to claim 1, wherein the manual gearbox comprises a three-shaft planetary gear set and at least one form-fitting shift element of the shift actuator system, via which the planetary gear set can be blocked to represent a direct drive.

6. The drive unit according to claim 5, wherein the planetary gear set is assigned two form-fit shift elements the shift actuator system, via which in each case at least two shafts of the planetary gear set can be alternately connected to a drive shaft of a drive mechanism and fixed on a housing side to realize three speeds, while the planetary gear set is driven via the third shaft.

7. The drive unit according to claim 6, wherein the shift actuator system has an actuator via which the shift element or the shift elements and the actuation unit can be driven.

8. The drive unit according to claim 5, wherein speeds of the at least two shafts of the planetary gear set can be synchronized in each case via the drive mechanism during traction-interrupted shifts in the manual gearbox.

9. The drive unit according to claim 5, wherein an output drive of the planetary gear set is connected to a further gearbox unit configured as a spur gear stage.

10. The drive unit according to claim 9, wherein a drive side of the planetary gear set is connected to an output shaft of the drive mechanism via a gearbox unit configured as a spur gear stage.

11. A drivable vehicle axle comprising the drive unit according to claim 1.

12. The drivable vehicle axle according to claim 11, wherein a further gearbox unit is connected to driving wheels via an axle differential.

13. A drive unit with a parking lock arrangement, comprising:

a parking lock gear, that is held in a rotationally fixed manner by a parking lock pawl in a locking position of the parking lock pawl and rotates in a release position of the parking lock pawl;

a parking lock tappet configured to be longitudinally displaceable between a locking shift position and a releasing shift position and to be acted upon by a shifting force, to engage the parking lock tappet in a direction of the locking shift position;

an actuation unit operatively connected to a shift actuator system of a manual gearbox having at least two speeds;

wherein the parking lock tappet is assigned a latching device, the latching device comprises an armature of an electromagnet impinged with a spring force of a latching spring unit, which is adjusted by the latching spring unit in the unenergized state of the electromagnet in the direction of a latching shift position, in which the armature is in operative connection with latching elements, via which the parking lock tappet can be maintained in a positive-locking manner in its releasing shift position. position;

wherein the parking lock pawl is held in the locking position by the parking lock tappet when the parking lock tappet is in the locking shift position;

wherein the parking lock tappet is transferred by the actuation unit against the shifting force into the releasing shift position, in which the parking lock tappet releases the actuating movement of the parking lock pawl in the direction of the release position; and wherein the actuation unit is configured to transfer the parking lock tappet by means of mutually spaced shift cams from the locking shift position into the releasing shift position when one of the at least two speeds is engaged in the manual gearbox, and to release the actuating movement of the parking lock tappet in the direction of the locking shift position when the manual gearbox is in a neutral operating state in which none of the at least two speeds is engaged in the manual gearbox and the power flow is interrupted.

14. A drive unit with a parking lock arrangement, the drive unit comprising:

a parking lock pawl operable between a locking position and a release position;

a parking lock gear, which can be held in a rotationally fixed manner by a rotatably mounted parking lock pawl in the locking position and can be rotated in the release position of the parking lock pawl;

a parking lock tappet, which is designed to be longitudinally displaceable between a locking shift position and a releasing shift position and acted upon by a shifting force, which acts on the parking lock tappet in a direction of the releasing shift position, in which the parking lock tappet releases the actuating movement of the parking lock pawl in a direction of the release position, wherein the parking lock pawl is held in the locking position by the parking lock tappet when the parking lock tappet is in the locking shift position, wherein the parking lock tappet can be moved into the locking shift position by an actuation unit against the shifting force;

a latching device assigned to the parking lock tappet, the latching device being controlled by an electromagnet; and wherein the actuation unit is operatively connected to a shift actuator system of a manual gearbox having at least two speeds, the actuation unit configured to transfer the parking lock tappet from the releasing shift position into the locking shift position by means of shift cams spaced apart from one another when the manual gearbox is in a neutral operating state, in which no speeds are engaged in the manual gearbox and the power flow is interrupted, and to enable the actuating movement of the parking lock tappet in the direction of the releasing shift position when a speed is engaged in the manual gearbox.

15. The drive unit according to claim 14, wherein:

the actuation unit comprises a longitudinally displaceable gear rack formed with a plurality of shift cams;

the shift cams project from a longitudinal side of the gear rack in the direction of the parking lock tappet and are spaced apart from one another in the shifting direction of the gear rack;

the gear rack interacts with one of the shift cams with the end of the parking lock tappet facing the gear rack when one of the at least two speeds is respectively engaged in the manual gearbox and the gear rack holds the one of the shift cams in the releasing shift position; and the end of the parking lock tappet facing the gear rack is arranged between two shift cams in the neutral operating state of the manual gearbox and the parking lock tappet is in the locking shift position.

16. The drive unit according to claim 14, wherein:

the actuation unit comprises a longitudinally displaceable gear rack with a plurality of shift cams;

the shift cams project from a longitudinal side of the gear rack in the direction of the parking lock tappet and are spaced apart from one another in a shifting direction of the gear rack;

the gear rack cooperates with one of the plurality of shift cams with an end of the parking lock tappet facing the gear rack when a speed of the at least two speeds is engaged in the manual gearbox and the gear rack holds the one of the plurality of shift cams in the locking shift position; and the end of the parking lock tappet facing the gear rack is arranged between two shift cams in the neutral operating state of the manual gearbox and the parking lock tappet is in the releasing shift position.

17. The drive unit according to claim 14, wherein:

the actuation unit comprises a shift drum formed with a plurality of shift cams;

the shift cams project in a radial direction from an outer side of the shift drum and are spaced apart from one another in the circumferential direction of the shift drum;

the shift drum in each case, when a speed of the at least two speeds is engaged in the manual gearbox, interacts with one of the shift cams with the end of the parking lock tappet facing the shift drum and holds the one of the shift cams in the locking shift position; and the end of the parking lock tappet facing the shift drum is arranged between two shift cams in the neutral operating state of the manual gearbox and the parking lock tappet is in the releasing shift position.

18. The drive unit according to claim 14, wherein the latching device is configured to be automatically activated in the locking shift position of the parking lock tappet and configured to maintain the parking lock tappet latched in the locking shift position.

19. The drive unit according to claim 18, wherein the latching device comprises an armature of the electromagnet, the armature loaded in the latching direction with a spring force of a latching spring unit and, in the unenergized state of the electromagnet, is adjusted by the latching spring unit in the direction of a latching shift position, in which the armature is operatively connected to latching elements, via which the parking lock tappet can be held in its locking shift position with a form fit.

* * * * *